UNITED STATES PATENT OFFICE.

LUDWIG KERN, OF HAMBURG, GERMANY.

FERTILIZER AND PROCESS OF MANUFACTURING SAME.

1,144,905. Specification of Letters Patent. Patented June 29, 1915.

No Drawing. Application filed March 27, 1915. Serial No. 17,577.

*To all whom it may concern:*

Be it known that I, LUDWIG KERN, a subject of the German Emperor, and a resident of Hamburg, Germany, have invented new and useful Improvements in Fertilizer and Processes of Manufacturing Same, of which the following is a full, clear, and exact description.

The object of this invention is to provide certain new and useful improvements in the manufacture of fertilizer whereby a fertilizer in powder form is produced in a very economical manner and one which is particularly useful in fields used for raising plants rich in silicic acids such as corn, cereals, grass, etc., and for use in moors and like ground which requires enrichment in silicic acid.

In order to accomplish the desired result, use is made of waste sulfite liquor mixed with raw kieselguhr such as is found mixed with mineral and organic substances.

As is well known waste sulfite liquor is produced in large quantities in the manufacture of pulp with the aid of sulfurous acid or sulfites, and the disposal of this waste liquor is expensive to the manufacturers as no suitable means have so far been found to render the liquor harmless or useful on a large scale. This waste sulfite liquor contains beside a larger percentage of water the dissolved substances of the wood as well as sulfurous acid, sulfuric acid and lime. Kieselguhr mixed with large quantities of mineral and organic substances is practically useless for the purpose for which kieselguhr is generally used in the arts. Such low grade impure kieselguhr is found, however, in large beds in various parts of the world, notably in the district extending from Chesapeake Bay to Richmond, Va. The low grade kieselguhr referred to contains more or less quantities of diatomaceous shells and has extraneous matter which contains calcium carbonate and calcium sulfate, carbonates of magnesium, potassium and sodium, oxid of iron, protocarbonate of iron, colloidal silicic acid and mineral and organic substances. The extraneous substances mentioned render the impure kieselguhr very serviceable as a fertilizer when mixed with waste sulfite liquor. Thus two practically valueless products are utilized to form an exceedingly valuable article of commerce.

The process is carried out as follows: According to the more or less concentrated or non-concentrated state of the waste sulfite liquor and according to the number of silicic shells in the kieselguhr, 1 to 4 parts are mixed to produce a fertilizer in powder form capable of being strewn over a field. By mixing the kieselguhr and the waste sulfite liquor, the free sulfurous acid and the free sulfuric acid of the liquor combine with the basic substances of the kieselguhr to form corresponding salts and at the same time the siliceous shells of the kieselguhr absorb the watery and soluble substances of the liquor and the minutely divided organic slimes contained in the liquor. According to the nature of the extraneous substances in the kieselguhr, a mixture is formed which contains salts and silicates of sodium, calcium, magnesium, aluminium; also colloidal silicic acid of about ten per cent. is contained in the undissolved kieselguhr as well as substances containing nitrogen, which are partly contained in the waste sulfite liquor and partly in the kieselguhr.

In practice the process is carried out in such a manner that the waste sulfite liquor is completely absorbed by the kieselguhr and a sufficient quantity of kieselguhr is left over so that the resultant mass is in powder form and can be readily strewn over a field. The sulfite liquor may be used either as originally received as a waste product or it may be concentrated prior to mixing it with the kieselguhr. The process may also be carried out with the waste sulfite liquor in hot or cold condition.

Instead of the ordinary waste sulfite liquor referred to, use may be made of a waste sulfite liquor which had been used in the manufacture of sulfite sprit. Use may be also made of a waste sulfite liquor which has been derived of a portion of its sulfurous acid by atomizing the liquor. The waste sulfite liquor used may be deprived of a portion of its water by concentration.

In case it is necessary to mix a larger quantity of waste sulfite liquor with kieselguhr than the latter is capable of absorbing then a more or less pasty product is obtained which requires drying. The drying process can be carried out by spreading the pasty mass on a suitable surface in the open air or it can be done artificially. In drying the mass artificially use is preferably made of waste gases from a boiler or other furnace and passed over the mass.

This procedure has the advantage that the fertilizer is enriched by absorption of some of the substances contained in the gases such as carbonic acid, nitrogen, and oxygen, of which the carbonic acid and the nitrogen add to the fertilizing quality of the mass and the oxygen tends to oxidize the salts of sulfurous acid to sulfates. The resultant mass is preferably agitated in a drying drum in which the gases are passed in the opposite direction to the mass whereby the mass crumbles into a powder capable of being strewn on a field. In some cases the dried product has to be reduced to powder form by suitable mechanical means. As the kieselguhr varies according to the bed in which it is found it is sometimes necessary to add other substances which increase the quality of the fertilizer and which combine with the free acids of the sulfite liquor. Such additional substances are nitrate of potassium, ammonium compound and calcium nitrate. In using the waste sulfite liquor in the natural state it is only necessary to use an ordinary mixing apparatus in order to produce the fertilizer in powder form.

Instead of the ordinary waste sulfite liquor, use may be made of one from which substances such as hexoses have been extracted and such as have been atomized, as previously mentioned.

The fertilizer produced is very voluminous, and when used it tends to enrich the ground, and on account of its hydroscopic and porous nature it is capable of absorbing water, carbonic acid, carbonate of ammonium and the like, which all tends to facilitate the growing of the plants. The fertilizer, on account of its large amount of easily disintegrating organic substances forms a desired means for the propagation of bacteria. The property of retaining water is of importance when used on dry ground especially during warm weather owing to the fact that the plants find the water necessary for their proper growth. The fertilizer is especially useful for sandy ground, poor clayey bottoms, fields containing lime or ground poor in humus and nitrogen, and is exceedingly serviceable as a fertilizer for fields in which rye, oats, wheat, corn, grass and cereals are grown.

Having thus described my invention, I claim as new and desire to secure by Letters Patent:

1. The herein described process for the manufacture of fertilizer which consists in mixing waste sulfite liquor with kieselguhr associated with extraneous mineral and organic substances.

2. The herein described process for the manufacture of fertilizer which consists in mixing hot waste sulfite liquor with kieselguhr associated with extraneous mineral and organic substances.

3. The herein described process for the manufacture of fertilizer which consists in mixing previously atomized waste sulfite liquor with kieselguhr associated with extraneous mineral and organic substances.

4. The herein described process for the manufacture of fertilizer which consists in mixing waste sulfite liquor previously deprived of hexoses with kieselguhr associated with extraneous mineral and organic substances.

5. The herein described process for the manufacture of fertilizer which consists in mixing waste sulfite liquor with kieselguhr associated with extraneous mineral and organic substances and adding to the mixture calcium nitrate.

6. The herein described process for the manufacture of fertilizer which consists in mixing waste sulfite liquor with kieselguhr associated with extraneous mineral and organic substances, adding to the mixture calcium nitrate and then subjecting the mass to the action of the waste gases of a furnace.

7. The herein described process for the manufacture of fertilizer which consists in mixing waste sulfite liquor with kieselguhr associated with extraneous mineral and organic substances, adding to the mixture calcium nitrate, and then agitating the mass and simultaneously subjecting it to the action of the waste gases from a furnace.

8. The herein described fertilizer, consisting of a mixture including waste sulfite liquor and kieselguhr associated with extraneous mineral and organic substances.

9. The herein described fertilizer, consisting of a mixture including waste sulfite liquor and kieselguhr associated with extraneous mineral and organic substances and in which the sulfurous acid and the sulfuric acid of the liquor is combined with the basic substances of the kieselguhr to form corresponding salts and in which the watery and soluble substances of the sulfite liquor and the minutely divided organic slimes of the kieselguhr are absorbed by the silicic shells of the kieselguhr.

10. The hereindescribed fertilizer, consisting of a mixture of waste sulfite liquor and kieselguhr associated with extraneous mineral and organic substances and calcium nitrate.

In testimony whereof I have signed my name to this specification in the presence of two subscribing witnesses.

LUDWIG KERN.

Witnesses:
FRANCIS R. STEWART,
CHARLES A. HALLER, Jr.,